United States Patent [19]

Kodera

[11] Patent Number: 4,827,592
[45] Date of Patent: May 9, 1989

[54] AUTOMATIC WIRE CUTTING AND STRIPPING METHOD AND APPARATUS

[75] Inventor: Hiroji Kodera, Gifu, Japan

[73] Assignee: Kabushiki, Kaisha, Kodera, Denshi, Seisakusho, Gifu, Japan

[21] Appl. No.: 89,669

[22] Filed: Aug. 26, 1987

[30] Foreign Application Priority Data

Jan. 20, 1987 [JP] Japan .................................. 62-11119

[51] Int. Cl.⁴ ............................................ H01R 43/04
[52] U.S. Cl. .................................... 29/426.4; 29/868; 29/748; 81/9.51
[58] Field of Search ................. 29/426.1, 426.3, 426.4, 29/868, 566.1, 748; 81/9.51

[56] References Cited

U.S. PATENT DOCUMENTS 4,631,823 12/1986 Collier et al. ..................... 81/9.51 X
4,719,697 1/1988 Schwartzman et al. ......... 81/9.51 X Primary Examiner—Howard N. Goldberg
Assistant Examiner—Taylor J. Ross
Attorney, Agent, or Firm—Philip P. Mann; Michael D. Rechtin

[57] ABSTRACT

An automatic covered wire cutting and stripping method and an apparatus used for the method. The method comprises the steps of transferring a covered wire by a transfer mechanism toward a cutting mechanism disposed opposite to the transfer mechanism so as to protrude the covered wire from the cutting mechanism by a specified length in the direction away from the transfer mechanism, cutting a cover of the covered wire by the cutting mechanism to prepare the specified length of a cover part to be stripped, transferring the covered wire toward the transfer mechanism, gripping the cover part to be stripped off the covered wire by a grip mechanism, and transferring the covered wire toward the transfer mechanism such that the cover part to be stripped off the covered wire is gripped by the grip mechanism thereby stripping the specified length of the cover from the covered wire.

7 Claims, 7 Drawing Sheets

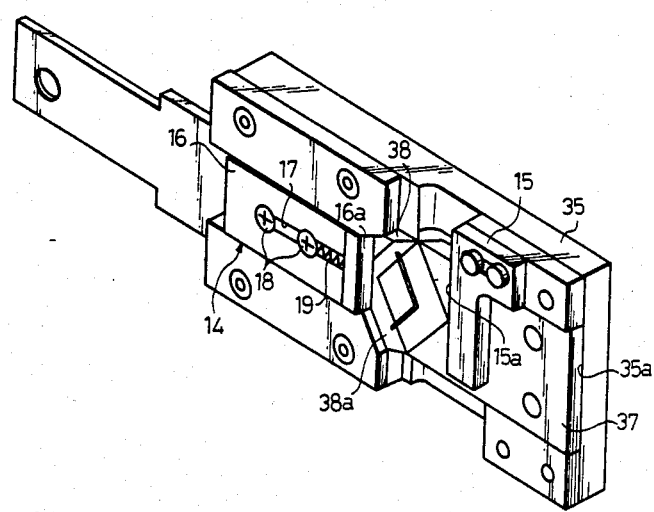
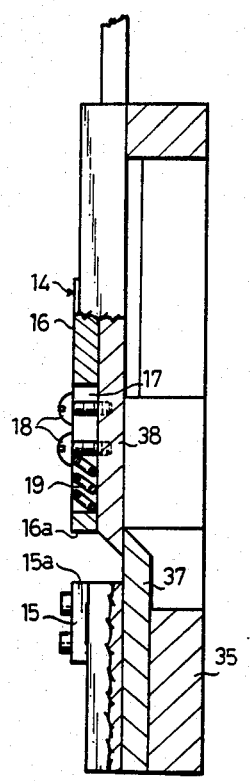
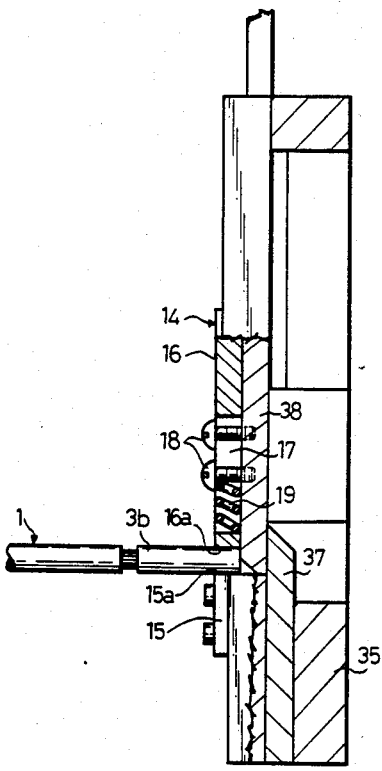

AUTOMATIC WIRE CUTTING AND STRIPPING METHOD AND APPARATUS

FIELD OF THE INVENTION

The present invention relates to an automatic wire cutting and stripping method and apparatus for covered wires to be used for a variety of electrical appliances.

DESCRIPTION OF THE RELATED ART

A covered wire used for electronic and electric appliances is generally cut to a specified length and has the cover of the front and rear ends thereof, stripped.

With increasing demand and diversification of electronic and electric appliances in these years, the applicant of the present invention has proposed the automatic wire cutting and stripping apparatus (Japanese Patent Application Laying-open No. 60-204206) as illustrated in FIG. 13 as an apparatus for cutting and stripping the covered wire described previously.

Namely, said apparatus comprises a rear side transfer mechanism 74 which includes a pair of rollers 75, 76 for sending and pulling a covered wire 71 through reversible rotation, a front side transfer mechanism 79 which includes a pair of rollers 77, 78 for taking out and resending the covered wire 71 through reversible rotation, a cutting mechanism 82 which includes a pair of cutting blades 80, 81 for cutting the covered wire 71 and stripping off the cover, and an operation control mechanism (not illustrated) which includes a computer for controlling operations of said mechanisms.

This apparatus is formed with a comparatively simplified structure; and therefore, the apparatus itself can be made compact, can improve working efficiency and has been used widely.

However, according to the construction of this automatic wire cutting and stripping apparatus, a cover of the covered wire 71 is cut and stripped between said cutting blades 80, 81 of the cutting mechanism 82, so that the cover having been stripped is pressed hard to the cutting blades 80, 81 and consequently, the cover sticks thereto temporarily. In case continuous cutting and stripping job are performed the, next stripping job is occasionally performed in a state that the stripped cover still sticks to a portion of the cutting blades 80, 81. In this case, if said cover sticks to the side of the cutting blade 80 when the cutting mechanism 82 cuts the covered wire 71, the other cutting blade 81 cuts the cover of the covered wire 71 too much. Therefore, even a core wire at the center portion of the covered wire 71 may be occasionally cut.

SUMMARY OF THE INVENTION

It is accordingly an object of the present invention to provide an automatic wire cutting and stripping method which can prevent a cover stripped from a covered wire from sticking to cutting blades and causing a problem in the next cutting job cycle.

It is another object of the present invention to provide an automatic wire cutting and stripping method which can prevent the covered wire from coming off the grip members before the stripping work has been completed when a substantial tensile force is put on the covered wire.

It is a further object of the present invention to provide an automatic wire cutting and stripping method and apparatus in which the grip members do not put an excessive force on the covered wire.

It is a further object of the present invention to provide an automatic wire cutting and stripping method and apparatus which can prevent the covered wire or its cover from being out when the covered wire is bent.

It is a further object of the present invention to provide an automatic wire cutting and stripping method in which the covered wire to be cut next does not interfere with transfer of the covered wire having been cut.

In order to achieve the objects described previously, the present invention comprises the steps for:

transferring a covered wire by transfer means toward cutting means disposed opposite to the transfer means so as to extend the covered wire from the cutting means by a specified length in the direction away from the transfer means, cutting a cover of the covered wire by the cutting means to prepare the specified length of a cover part to be stripped, transferring the covered wire toward the transfer means by the same, gripping the cover part to be stripped of the covered wire by grip means, and transferring the covered wire toward the transfer means by the same in the state that the cover part to be stripped of the covered wire is gripped by the grip means thereby stripping the specified length of the cover from the covered wire.

The other objects of the present invention will become apparent from sufficient understanding of the preferred embodiments described hereafter and will be defined clearly in the appended claims thereof, the scope of the present invention will be apparent to those who are skilled in this art and of a variety of advantages set forth.

BRIEF DESCRIPTION OF THE DRAWINGS

FIG. 1 to FIG. 12 illustrates an embodiment of the present invention.

FIG. 1 is a front view illustrating an apparatus of the present invention.

FIG. 2 is a perspective view illustrating the grip mechanism of FIG. 1.

FIG. 3 is a partly broken sectional view of FIG. 2.

FIG. 4 is a view similar to that of FIG. 3 and illustrating the state in which the covered wire is gripped.

FIG. 5 is a perspective view illustrating a guiding member.

FIG. 6 is a schematic plan view illustrating a rotating mechanism of the guiding member.

FIG. 7 and FIG. 8 are plan views respectively illustrating rotated condition of the guiding member.

FIG. 9 is a front view illustrating the operation control apparatus.

FIG. 10 is a schematic side view illustrating the step for stripping the front end side cover of the covered wire.

FIG. 11 is a schematic side view illustrating the step for stripping the rear end side cover of the covered wire.

FIG. 12 is a front view illustrating a covered wire manufactured by the apparatus of the present invention.

DETAILED DESCRIPTION OF THE PREFERRED EMBODIMENT

A preferred embodiment of the present invention will be described subsequently with reference to FIG. 1–12.

First, a covered wire which has been cut and stripped by the method of the present invention will be explained.

Figure 12:
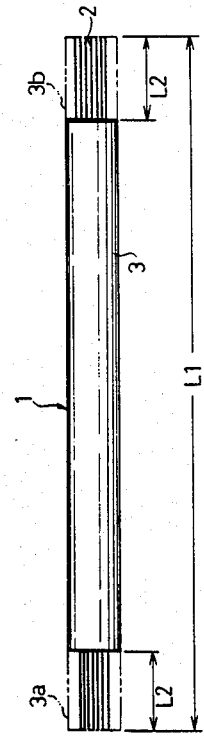
Figure 13:
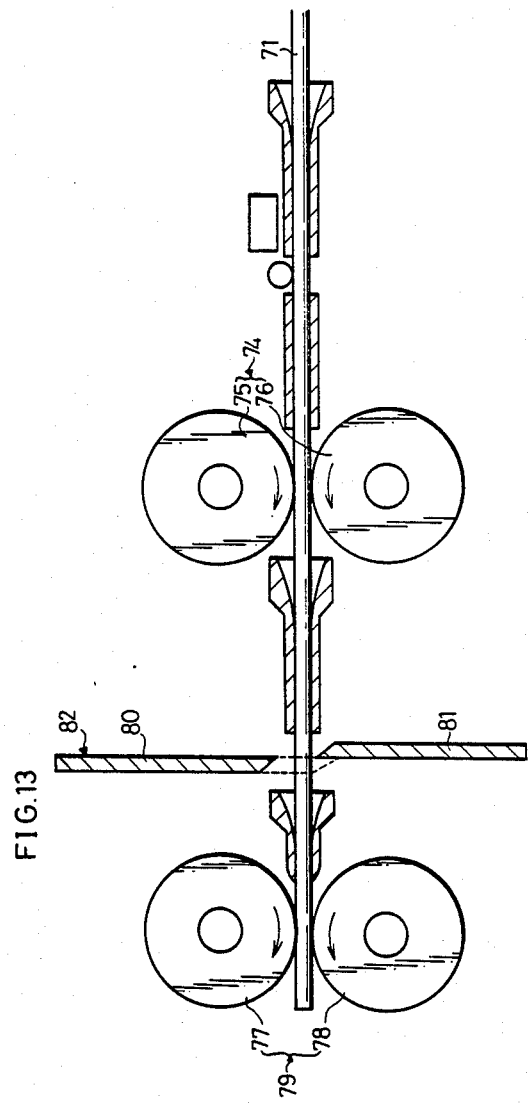
FIG. 13 is a schematic view illustrating an apparatus of related art.

As illustrated in FIG. 12, the covered wire 1 is formed by a core wire 2 and a cover 3 coated around the core wire 2.

The cover of the front end side (hereinafter expressed as a front side cover 3a) and the cover of the rear end side (hereinafter expressed as a rear side cover 3b) have been respectively stripped by the specified length L2.

Next, the wire cutting and stripping apparatus which is used for the method of the present invention will be described.

This apparatus mainly comprises a rear side transfer mechanism 11 which includes a pair of rollers 12, 13 for sending and pulling a continuous covered wire 1 through the reversible rotation, a guiding mechanism 21 provided in front of both rollers 12, 13 for guiding said covered wire 1 to the next mechanism, a cutting mechanism 31 provided in front of said guiding mechanism 21 for cutting off the covered wire 1 and cutting the cover 3, a grip mechanism 14 provided in front of said cutting mechanism 31 for gripping the rear side cover 3b, which is to be a stripped part at the rear end side of said covered wire 1, a front side transfer mechanism 41 which is provided in front of said grip mechanism 14 and includes a pair of rollers 42 and 43 for taking out and resending said covered wire 1, and an operation control unit 51 which includes a computer 52 for controlling operations of said mechanisms 11, 14, 21, 31 and 41. This apparatus will then be explained mechanism by mechanism.

REAR SIDE TRANSFER MECHANISM 11

Figure 1:
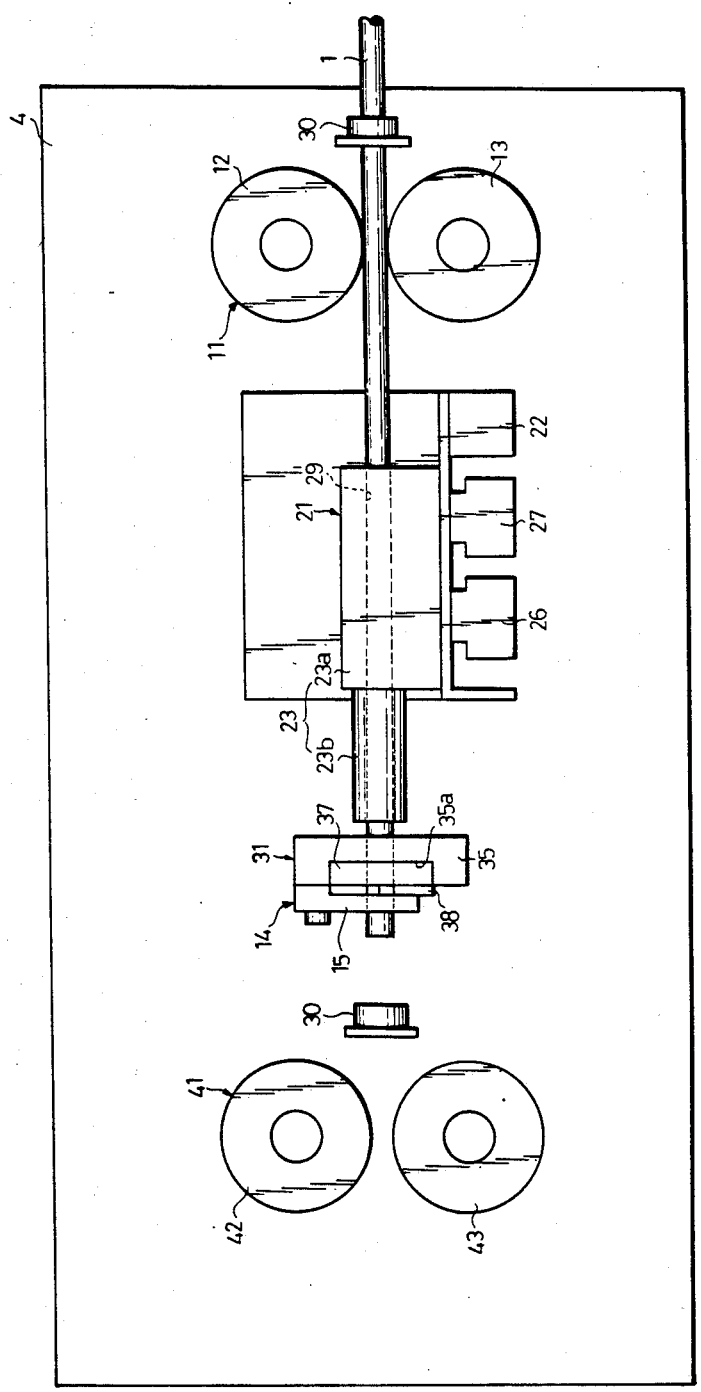

As illustrated in FIG. 1, a pair of upper and lower rollers 12, 13 is supported on a right end of a front face of a case 4 so that they can rotate in reciprocal directions: a direction for sending the covered wire 1 to the guiding mechanism 21 (normal rotation) and that for pulling back the covered wire from the guiding mechanism 21 (reverse rotation). The covered wire 1 is sent to or pulled back from the mechanisms disposed in front of the rear side transfer mechanism 11 with the rotations of the rollers 12, 13. Said rollers 12, 13 are respectively rotated in the reciprocal directions by a pair of pulse motors 12a, 13a (shown only in FIG. 9). Both the pulse motors 12a, 13a have operating condition thereof controlled by a computer 52 described later.

GUIDING MECHANISM 21

Figure 5:
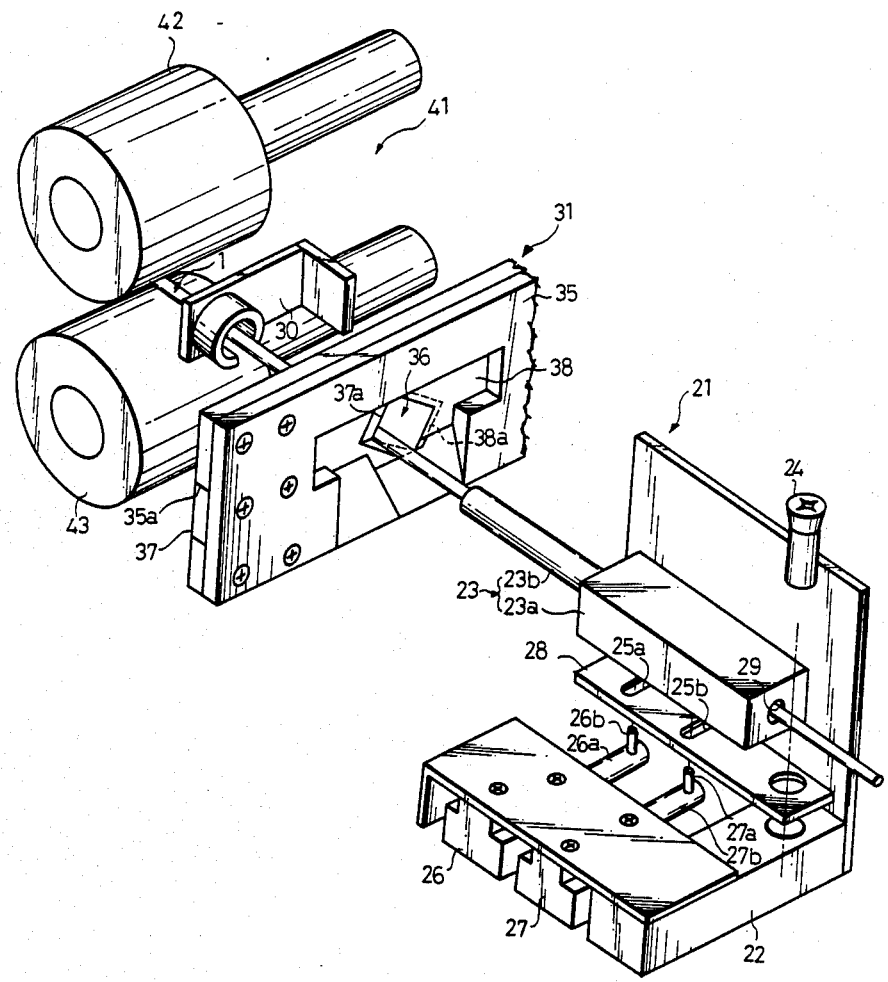
Figure 6:
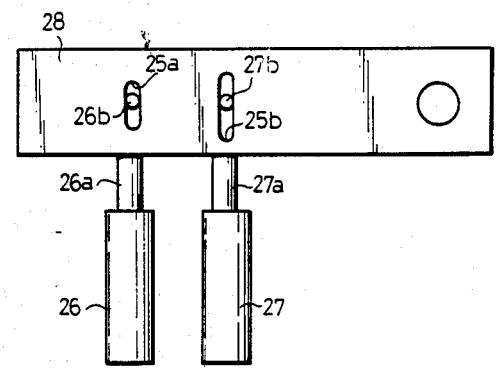

As illustrated in FIG. 1 and FIG. 5, a frame 22 is attached in front (on the left in FIG. 1) of said first transfer mechanism 11. A guiding member 23 is provided on the upper surface of the frame 22. The guiding member 23 comprises a main body 23a of rectangular shape having a through hole 29 and a guiding tube 23b having a hole (not illustrated) to be connected with the through hole 29.

A plate-like regulating member 28 is fixed below the main body 23a. The guiding member 23 is attached to the upper surface of the frame 22 with a bolt 24 through the regulating member 28 so that it can rotate horizontally. The guiding member 23 is always held at the position indicated by a solid line in FIG. 7 by an energizing means not illustrated (e.g. a spring). The regulating member 28 is provided with two slots 25a, 25b. A pair of solenoids 26, 27 having movable iron cores 26a and 27a is provided on the frame 22. Engaging protrusions 26b, 27b attached to the movable iron cores 26a, 27a are inserted into the slots 25a, 25b. The slots 25a, 25b are different in length, so that the rotating angle of the guiding member 23 in the horizontal direction is controlled in two ways by moving either one of the solenoids 26, 27.

Accordingly, when said guiding member 23 sends or pulls the covered wire 1, the covered wire 1 is, as indicated by a solid line in FIG. 7, situated at an intermediate position between a fixed cutting blade 37 and a movable cutting blade 38 described later without any contact with them. Moreover, at the time of cutting the covered wire 1 and the cover 3, the guiding member 23 rotates, as indicated by the chain line of FIG. 7, to the first position wherein the covered wire 1 is in contact with a blade part 37a of the fixed cutting blade 37. Next, when the covered wire 1 having been cut is to be resent to the rear side transfer means 11 and stripped, the guiding member 23 rotates further, as indicated by a solid line FIG. 8, to the second position wherein the covered wire 1 having been cut does not collide with the guiding tube 23b.

Said pair of solenoids 26, 27 has the operation thereof controlled by the computer 52.

CUTTING MECHANISM 31

As illustrated in FIGS. 1, 2 and 5, in front of said guiding mechanism 21, a fitting plate 35 having an aperture 36 is supported vertically at the one end thereof. A housing groove 35a is formed at the front surface of the fitting plate 35. The fixed cutting blade 37 is housed and fixed to the housing groove 35a and a V-shaped blade part 37a is formed at the end part of the fixed cutting blade 37.

In addition, the movable cutting blade 38 is housed in the housing groove 35a so as to be opposed to the fixed cutting blade 37. The movable cutting blade 38 is supported in such a manner that it can make reciprocal movements in the right and left directions in FIG. 5 by a drive unit 39 (illustrated only in FIG. 9). The V-shaped blade part 38a is formed at an end part of the movable cutting blade 38.

The movable cutting blade 38 makes the reciprocal movements under control of the computer 52 and cuts off the covered wire 1 or cuts only the cover 3.

GRIP MECHANISM 14

As illustrated in FIGS. 1 to 4, an angle-shaped fixed side grip member 15 is secured with bolts to a front surface of the fixed cutting blade 37 on the fitting plate 35. A grip part 15a of the grip member 15 protrudes forward from the fixed cutting blade 37.

As illustrated in FIG. 2, a quadrangular plate-like movable side grip member 16 is fixed to a front surface of the movable cutting blade 38 in such a manner that it can move in the right and left directions. A grip part 16a of the grip member 16 protrudes forward from the movable cutting blade 38. More particularly, as illustrated in FIG. 3 and FIG. 4, a groove 17 is formed at the center of said movable side grip member 16 and extends in the length direction thereof. A pair of bolts 18 (the ends of which are screwed into the movable cutting blade 38) is disposed in the groove 17. In said groove 17, an elasticity giving or restoring means, preferably a coil spring 9, is interposed in compressed condition between the bolt 18 of the grip part 16a side and the grip part 16a. Therefore, when both the grip parts 15a, 16a grip the rear side cover 3b of the covered wire 1, no excessive force is put on the rear side cover 3b.

Said movable side grip member 16 reciprocates in the same directions as those of the movable cutting blade 38 when the same 38 moves directed by the computer 52. Then, both the grip parts 15a, 16a grip the rear side cover 3b.

Further, although it is not illustrated, both the grip parts 15a, 16a are processed by knurling for non-slip purpose.

FRONT SIDE TRANSFER MECHANISM 41

As illustrated in FIG. 1 and FIG. 5, a pair of upper and lower rollers 42, 43 are provided in front of the grip mechanism 14 so that they can rotate in reciprocal directions: a direction for taking out the covered wire 1 from the cutting mechanism 31 (normal rotation) and that for resending to the same (reverse rotation). The covered wire 1 is taken out or resent by the rotations of both the rollers 42, 43.

Figure 9:
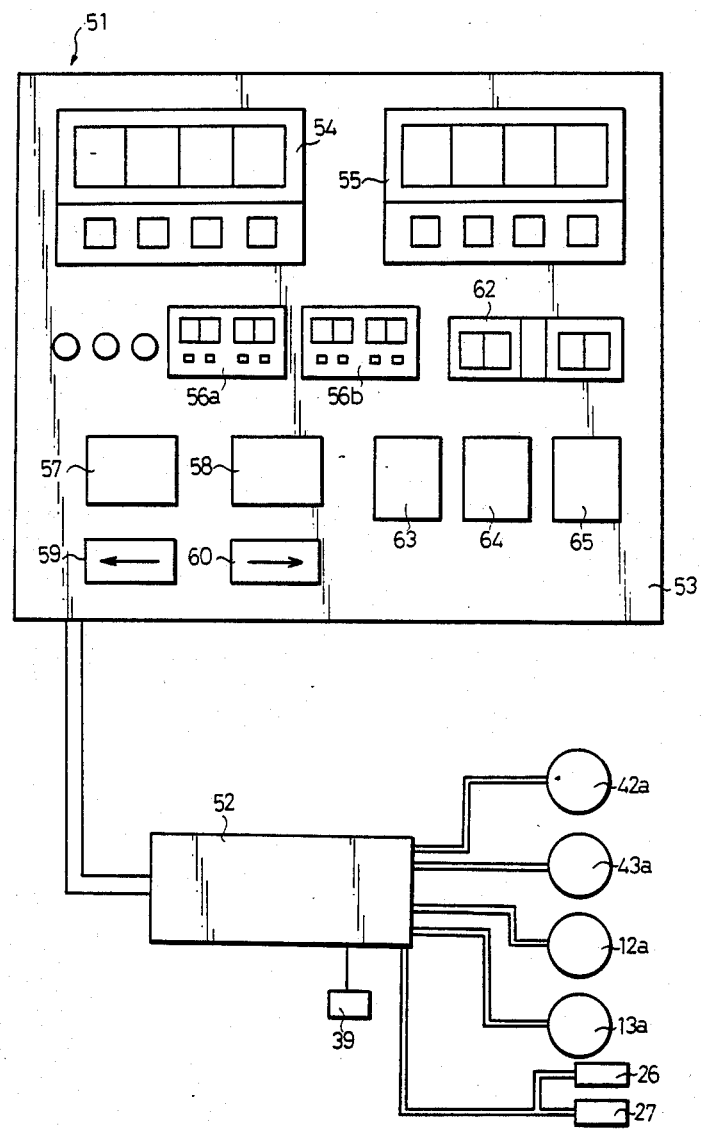

The rollers 42, 43 are respectively rotated in the reciprocal directions by a pair of pulse motors 42a, 43a (shown only in FIG. 9). The pulse motors 42a, 43a have the operating condition thereof controlled by the computer 52.

Further, a transfer tube 30 for guiding the covered wire 1 to said rollers 12, 13, 42, 43 is arranged and fixed not only between the grip mechanism 14 and the front side transfer mechanism 41 but also behind the rear side transfer mechanism 11.

OPERATION CONTROL MECHANISM 51

As illustrated in FIG. 9, the pulse motors 42a, 43a, 12a, 13a, the solenoids 26, 27 and the drive unit 39 are respectively connected with the computer 52 through lead wires 101. This computer 52 is also connected to an operation box 53 through the lead wire 101.

On the surface of said operation box 53, a digit switch type length setting and display unit 54 is provided to set and display the cutting length L1 of the covered wire 1. At the right side of the length setting and display unit 54, a digit switch type wire number setting and display unit 55 is provided to set and display a number of wires to be cut of the covered wire 1. At almost the center of the operation box 53, stripping length setting and display unit 56a, 56b are provided to set each length L2, as desired, of the front and rear sides covers 3a, 3b which will be the exposed parts of both the front and rear sides of the covered wire 1 having been cut.

At a lower side of the operation box 53, a start switch 57, a stop switch 58, a sending switch 59 and a resending switch 60 are respectively provided. In addition, there are provided on the operation box 53 a wire number display unit 62 for displaying a number of covered wires 1 having been cut, a switch 63 for starting display operation of said wire number display unit 62, a reset switch 64 and a switch 65 for calculating a counted value when a cutting mistake occurs.

The cutting and stripping method for the covered wire 1 utilizing the automatic cutting and stripping apparatus thus constructed will be explained with reference to FIGS. 1, 4, 5, 7, 8, 10 and 11.

First, the covered wire 1 wound on a drum (not illustrated) is taken out prior to the cutting and stripping operations of the covered wire 1. Then, the sending switch 59 is turned on thereby introducing the covered wire 1 between the rollers 12, 13 of the rear side transfer mechanism 11 as well as inserting the covered wire 1 into the main body 23a and the guide tube 23b of the guiding mechanism 21. Furthermore, the covered wire 1 is shifted to a position between the fixed and movable cutting blades 37, 39. When the end part of the covered wire 1 is moved to a position slightly protruded from the cutting blades 37, 38, the sending switch is turned off in order to stop the rollers 12, 13. In this timing cycle, a limit switch (which is not illustrated) provided between the rollers 12, 13 and the guiding mechanism 21 measures the length of movement of the covered wire 1 and inputs its value to the computer 52.

Under this condition, the cutting length L1 of the covered wire 1 is set and displayed by operating the length setting and display unit 54. Besides, a number of wires to be cut is set by operating the cutting number setting and display unit 55. Moreover, the stripping lengths L2 of the front and rear side covers 3a, 3b are set respectively by operating the stripping length setting and display united 56a, 56b. When the start switch 57 is turned on under this condition, the covered wire 1 is automatically cut and stripped in such a way as follows.

Figure 10:
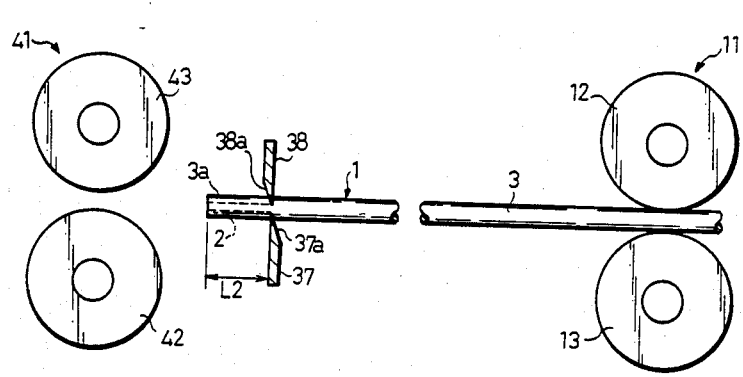
Figure 11:
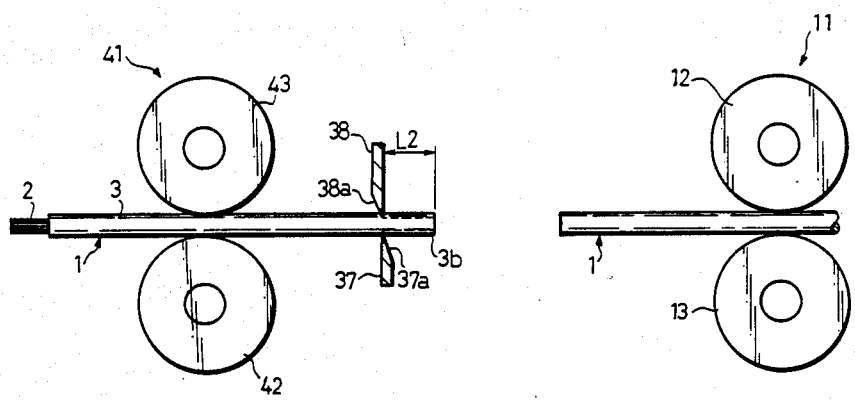

Namely, as illustrated in FIG. 10, the covered wire 1 is transferred and fixed to a position protruded from said cutting blades 37, 38 by the stripping length L2 through the normal rotation of both the rollers 12, 13. Then, the movable cutting blade 38 shifts toward the covered wire 1 by means of the drive unit 39 and cuts only the cover 3 of the covered wire 1. Thereafter, the front side cover 3a is stripped from on the core wire 2 of the covered wire 1 by reversely rotating both the rollers 12, 13 of the rear side transfer mechanism 11 in the above mentioned state.

Figure 7:
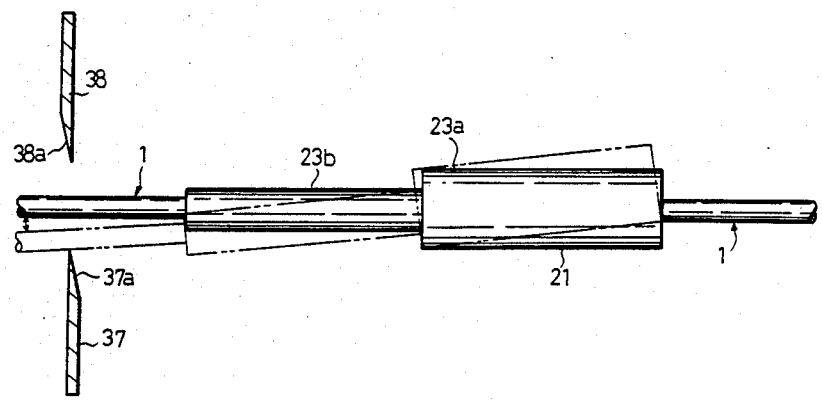
Figure 8:
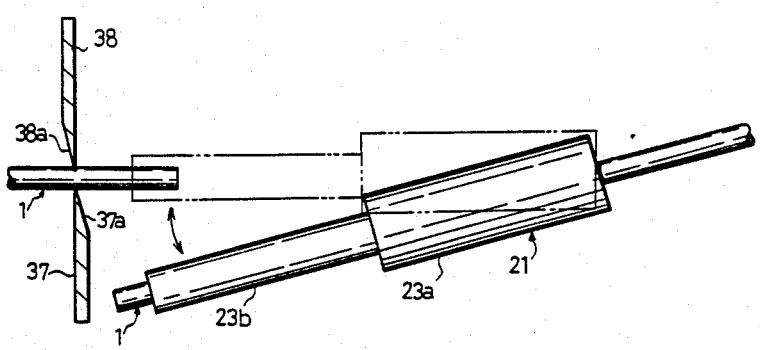

Prior to the cutting operation of the cover 3, the guiding mechanism 21 rotates the guiding member 23 in conjunction with the operation of the movable cutting blade 38 so that, as indicated by the two-dot chain line of FIG. 7, the circumferential surface of the covered wire 1 is in contact with the blade part 37a of the fixed cutting blade 37.

Accordingly, one can prevent said covered wire 1 being cut while it is bent at the front end part of the guiding tube 23b.

After the stripping operation of the front side cover 3a is completed, said guiding tube 23b is returned almost to the intermediate position between the fixed cutting blade 37 and the movable cutting blade 38. Said rollers 12, 13 are rotated normally so that the covered wire 1 is protruded from both the cutting blades 37, 38 by the cutting length L1 and then the rollers are stopped. The drive unit 39 is operated under such condition so as to cut the covered wire 1 by both the cutting blades 37, 39. Also, in this case, the covered wire 1 is in contact with the blade part 37a of the fixed cutting blade 37 due to the rotation of the guiding mechanism 21, as in the case of said cutting operation of the cover 3. Accordingly, the covered wire 1 is never cut under the condition that it is bent at the front end part of the guiding tube 23b.

The covered wire 1 having been cut is moved backward by the stripping length L2 of the rear side cover 3b from both the cutting blades 37, 38 through reverse rotation of the upper and lower rollers 42, 43 of the front side transfer mechanism 41. The movable cutting blade 38 moves in this condition and stops while cutting only the cover 3.

In this timing cycle, the covered wire 1 having been cut moves backward by the stripping length L2 of the rear side cover 3b. Therefore, the guiding member 23 and the covered wire 1 next to be cut obstruct the backward movement of the covered wire 1 having been cut if they are situated on the locus of backward movement of the covered wire 1. However, in this invention, said solenoid 27 is operated and said guiding tube 23b, (as indicated by the solid line of FIG. 8 goes out of said locus and the covered wire 1 having been cut never contacts the covered wire 1 to be cut next.

Thereafter, in the state that the movable cutting blade 38 has cut the cover 3, the upper and lower rollers 42, 43 are rotated in the normal direction and the covered wire 1 is put in a semi-stripped condition in which the core wire 2 of covered wire 1 is partially exposed (concretely, about 1 to 2 mm) as illustrated in FIG. 4. This is because the covered wire 1 is prevented from coming off the grip members 15, 16, while the rear end cover 3b remains intact in case a large tensile force is put on the covered wire 1 during the stripping operation of the rear end cover 3b (which will be described later).

Next, the movable cutting blade 38 is transferred from said cutting position and returned to the initial position. Then, the covered wire 1 is transferred by rotating said upper and lower rollers 42, 43 in the normal direction so that the rear end part of the rear side cover 3b is situated between the grip parts 15a, 15b of both the grip members 15, 16. After that, the movable side grip member 16 is moved toward the fixed side grip member 15 by moving said movable cutting blade 38 and the rear end part of the rear side cover 3b is gripped between both the grip parts 15a, 16a. Further, the covered wire 1 is sent forward by rotating the upper and lower rollers 42, 43 in the normal direction.

At this time, only the rear side cover 3b of the covered wire 1 is gripped between both the grip members 15, 16. Accordingly, the covered wire 1 moves forward, while only the rear side cover 3b is left between the grip members 15, 16. Thereafter, the covered wire 1 having both the sides stripped is transferred in front of the upper and lower rollers 42, 43. Namely, the rear side cover 3b to be stripped from the covered wire 1 is gripped and stripped at the parts other than both the cutting blades 37, 38, that is, between the grip members 15, 16. Consequently, one can prevent the rear side cover 3b sticking to the cutting blades 37, 38 and interfering with the next cutting job cycle.

In addition, an excessive force is never placed on the covered wire 1 because the coil spring 19 is attached to said movable side grip member 16. One can thus prevent the core wire 2 of the rear side cover 3b from being transformed by an abnormal large pressure.

Moreover, since the rear side cover 3b is semi-stripped at the time of the stripping action, the stripping operation can be performed.

After completion of said process, the solenoid 26 is demagnetized so that the guiding member 23 returns to a regular position, namely, almost to the intermediate position between both the cutting blades 37, 38. Subsequently, the covered wire 1 is not in contact with the blade part 37a of the fixed cutting blade 37 when the next covered wire 1 is inserted into the guiding member 23 and transferred into the cutting mechanism 31.

Thus, cutting and stripping operations of a single covered wire are terminated.

The present invention is not limited to said embodiment and for example, it can also be modified as follows.

(1) In said embodiment, the grip mechanism 14 is provided in front of the cutting mechanism 31, but it may be provided also on the guiding tube 23b behind the cutting mechanism 31.

(2) In said embodiment, both the fixed cutting blade 37 and the movable cutting blade 38 are used, but movable cutting blades may also be used as these cutting blades.

(3) In said embodiment, the cutting mechanism 31 is constituted of a pair of cutting blades 37, 38 so as to cut the covered wire 1 and strip the cover, but there may be used the cutting mechanism 31 having two or more pairs of cutting blades and performing said cutting and stripping operations by using a different pair of the blades.

(4) The grip mechanism 14 may be driven by drive means other than the cutting blade 38 of the cutting mechanism 31 when provided behind the cutting mechanism 31. According to this construction, the grip mechanism 14 can be used for the stripping operation of the front side cover 3a. Namely, the rollers 12, 13 are reversely rotated so as to transfer the covered wire 1 to the grip mechanism 14. Then, the grip mechanism 14 is operated to grip the covered wire. Thereafter, the rollers 12, 13 are further rotated in reverse direction, so that the stripping of the front side cover 3a is carried out.

(5) Said covered wire 1 may be perfectly stripped or semi-stripped at the front side thereof.

The present invention may also be applied to a process for stripping only one end part of the covered wire 1.

Since it is apparent to form the embodiments including a variety of modifications in wider range without departing frm the spirit and scope of the present invention, the present invention is not restricted by the particular embodiments thereof unless otherwise specified in the appended claims.

What is claimed is:

1. An automatic covered wire cutting and stripping method comprising the steps of:
    (a) transferring a covered wire by transfer means toward cutting means disposed substantially opposite to the transfer means so as to protrude the covered wire from the cutting means by a specified length in the direction away from the transfer means,
    (b) cutting a cover of the covered wire by the cutting means to prepare the specified length of a cover part to be stripped,
    (c) transferring the covered wire toward the transfer means,
    (d) gripping the cover part to be stripped off the covered wire by grip means wherein the grip means includes a pair of grip members and means for giving elasticity to one of the grip members so that both the grip members grip the covered part elastically through the elasticity giving means, and
    (e) transferring the covered wire toward the transfer means such that the cover part to be stripped off the covered wire is gripped by the grip means thereby stripping the specified length of the cover from the covered wire.

2. An automatic covered wire cutting and stripping method according to claim 1, wherein the grip means is provided on a side of the cutting means opposite to the transfer means.

3. An automatic covered wire cutting and decorticating stripping method according to claim 1, further comprising, between the steps (b) and (c), the step of preparing a semi-stripped condition in which the covered wire is partially stripped by transferring the covered wire a small distance toward the transfer means while the cutting means maintains a position to cut a cover of the covered wire.

4. An automatic covered wire cutting and stripping method according to claim 1, further comprising, before the step (a), the steps of transferring the covered wire through the cutting means toward the transfer means by a second transfer means so as to protrude the covered wire from the cutting means by a specified length, the second transfer means being disposed substantially opposite the transfer means while interposing the cutting means therebetween, supporting the covered wire by the second transfer means, and cutting the covered wire by the cutting means so as to prepare the specified length of the covered wire.

5. An automatic covered wire cutting and stripping method according to claim 4, wherein guiding means for guiding the covered wire is provided between the transfer means and the cutting means, and further comprising the step of moving a covered wire laterally during the transferring.

6. An automatic covered wire cutting and stripping method according to claim 1, further comprising, between the steps (a) and (b), the step of bringing the covered wire into contact with a fixed cutting blade of the cutting means, the cutting means including the fixed cutting blade and a movable cutting blade, and means for guiding the covered wire being provided between the transfer means and the cutting means.

7. An automatic covered wire cutting and stripping apparatus comprising:
(a) means for cutting a covered wire and a cover of the covered wire,
(b) means for transferring the covered wire to the cutting means, the transferring means being arranged opposite to the cutting means, and
(c) means for gripping part of the cover to be stripped of the covered wire, wherein the grip means includes a pair of grip members and means for giving elasticity to one of the grip members so that both the grip members grip the covered wire elastically through the elasticity giving means.

* * * * *